United States Patent
Sarkis et al.

(10) Patent No.: US 11,924,864 B2
(45) Date of Patent: Mar. 5, 2024

(54) NETWORK CODED SIDELINK COMMUNICATION USING RESERVED RESOURCES FOR RETRANSMISSION

(71) Applicant: QUALCOMM Incorporated, San Diego, CA (US)

(72) Inventors: Gabi Sarkis, San Diego, CA (US); Tien Viet Nguyen, Bridgewater, NJ (US); Guangyi Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/532,894

(22) Filed: Nov. 22, 2021

(65) Prior Publication Data

US 2023/0164821 A1    May 25, 2023

(51) Int. Cl.
| | |
|---|---|
| *H04W 72/12* | (2023.01) |
| *H04L 5/00* | (2006.01) |
| *H04W 72/20* | (2023.01) |
| *H04W 72/50* | (2023.01) |
| *H04W 72/566* | (2023.01) |

(52) U.S. Cl.
CPC ......... *H04W 72/535* (2023.01); *H04L 5/0053* (2013.01); *H04W 72/20* (2023.01); *H04W 72/569* (2023.01)

(58) Field of Classification Search
CPC . H04W 72/535; H04W 72/20; H04W 72/569; H04L 5/0053; H04L 5/0055; H04L 1/0076; H04L 1/1858; H04L 5/0044; H04L 5/0064; H04L 1/1887
See application file for complete search history.

(56) References Cited

U.S. PATENT DOCUMENTS

| | | | |
|---|---|---|---|
| 11,704,928 B1 * | 7/2023 | Kumar | G06V 40/12 |
| | | | 345/173 |
| 2017/0207885 A1 * | 7/2017 | Lee | H04W 72/1215 |
| 2019/0253192 A1 | 8/2019 | Zhou et al. | |
| 2020/0059821 A1 * | 2/2020 | Wirth | H04W 80/02 |
| 2020/0351855 A1 * | 11/2020 | Kung | H04L 1/1887 |

(Continued)

FOREIGN PATENT DOCUMENTS

| | | | | |
|---|---|---|---|---|
| WO | 2020132284 A1 | 6/2020 | | |
| WO | WO-2020132284 A1 * | 6/2020 | ............ | H04W 24/08 |
| WO | 2020191778 A1 | 10/2020 | | |

OTHER PUBLICATIONS

International Search Report and Written Opinion—PCT/US2022/049544—ISA/EPO—dated Mar. 1, 2023.

*Primary Examiner* — Wutchung Chu
(74) *Attorney, Agent, or Firm* — Loza & Loza LLP

(57) ABSTRACT

A sidelink device can perform a network coded sidelink transmission without increasing resource overhead by using resources originally reserved for retransmission of a packet. The sidelink device can reuse the reserved resources when retransmission is not needed based on feedback of the initial sidelink transmission. In one aspect, the sidelink device can use reserved retransmission resources to transmit a network coded transmission of sidelink data received from other sidelink devices. In one aspect, the sidelink device can use the reserved retransmission resources to transmit a network coded transmission including a retransmission of the sidelink device's own sidelink data and sidelink data from other devices.

30 Claims, 13 Drawing Sheets

(56) References Cited

U.S. PATENT DOCUMENTS

| | | | |
|---|---|---|---|
| 2021/0168790 A1* | 6/2021 | Li | H04L 1/1893 |
| 2021/0306824 A1* | 9/2021 | Li | H04W 4/40 |
| 2021/0321396 A1* | 10/2021 | Li | H04L 1/1896 |
| 2021/0336728 A1* | 10/2021 | Selvanesan | H04L 1/1854 |
| 2022/0007338 A1 | 1/2022 | Zhao et al. | |
| 2022/0007403 A1* | 1/2022 | Li | H04W 72/20 |
| 2022/0021483 A1* | 1/2022 | Cao | H04L 1/189 |
| 2022/0053522 A1* | 2/2022 | MolavianJazi | H04W 72/1263 |
| 2022/0209905 A1* | 6/2022 | Han | H04L 1/1887 |
| 2022/0224457 A1* | 7/2022 | Ebrahim Rezagah | H04L 1/08 |
| 2022/0248425 A1* | 8/2022 | Lee | H04W 72/1263 |
| 2022/0303952 A1* | 9/2022 | Hoang | H04L 5/0005 |
| 2022/0408464 A1* | 12/2022 | MolavianJazi | H04L 1/1812 |

* cited by examiner

NETWORK CODED SIDELINK COMMUNICATION USING RESERVED RESOURCES FOR RETRANSMISSION

TECHNICAL HELD

The technology discussed below relates generally to wireless communication systems, and more particularly, to network coded sidelink communication using resources reserved for retransmission.

INTRODUCTION

Wireless communication between devices may be facilitated by various network configurations. In one configuration, a cellular network may enable user equipment (UEs) to communicate with one another through signaling with a nearby base station or cell. Another wireless communication network configuration is a device-to-device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Sidelink communication may be transmitted in units of slots in the time domain and in units of sub-channels in the frequency domain. Each slot may include both sidelink control information (SCI) and sidelink data traffic. The SCI may be transmitted over a physical sidelink control channel (PSCCH), while the sidelink data traffic may be transmitted over a physical sidelink shared channel (PSSCH) within resources reserved on a sidelink carrier by the SCI. A sidelink device may reserve resources for sidelink retransmission when the initial sidelink transmission is not successful.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A sidelink device can perform a network coded sidelink transmission without increasing resource overhead by using resources originally reserved for retransmission of a packet. The sidelink device can reuse the reserved resources when retransmission is not needed based on feedback of the initial sidelink transmission. In one aspect, the sidelink device can use reserved retransmission resources to transmit a network coded transmission of sidelink data received from other sidelink devices. In one aspect, the sidelink device can use the reserved retransmission resources to transmit a network coded transmission including a retransmission of the sidelink device's own sidelink data and sidelink data from other devices.

One aspect of the disclosure provides an apparatus for wireless communication. The apparatus includes a transceiver configured for wireless communication, a memory, and a processor coupled to the transceiver and the memory. The processor and the memory are configured to transmit first sidelink data using a first resource of a plurality of resources reserved for transmitting the first sidelink data. The processor and the memory are further configured to receive second sidelink data from one or more sidelink devices. The processor and the memory are further configured to transmit network coded sidelink data comprising the second sidelink data using one or more second resources of the plurality of resources, based on a feedback of the first sidelink data.

One aspect of the disclosure provides a method for sidelink communication at a wireless apparatus. The method includes transmitting first sidelink data using a first resource of a plurality of resources reserved for transmitting the first sidelink data. The method further includes receiving second sidelink data from one or more sidelink devices. The method further includes transmitting network coded sidelink data comprising the second sidelink data using one or more second resources of the plurality of resources, based on a feedback of the first sidelink data.

Another aspect of the disclosure provides an apparatus for wireless communication. The apparatus includes means for transmitting first sidelink data using a first resource of a plurality of resources reserved for transmitting the first sidelink data. The apparatus further includes means for receiving second sidelink data from one or more sidelink devices. The apparatus further includes means for transmitting network coded sidelink data comprising the second sidelink data using one or more second resources of the plurality of resources, based on a feedback of the first sidelink data.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various implementations discussed herein. In similar fashion, while exemplary implementations may be discussed below as device, system, or method examples, it should be understood that such exemplary implementations can be implemented in various devices, systems, and methods.

DETAILED DESCRIPTION

Figure 1:
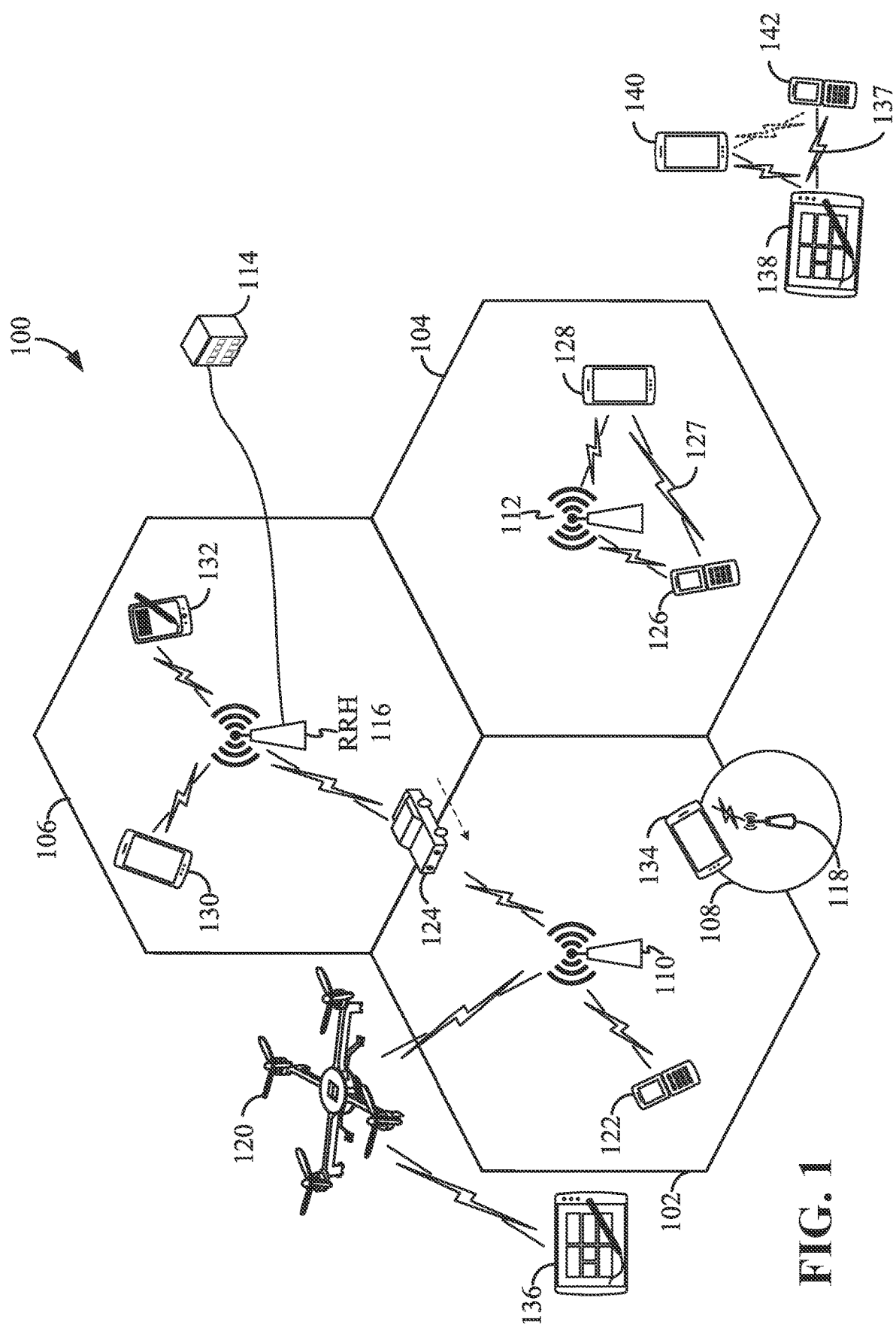
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Sidelink retransmission of one or more packets may be accomplished by network coding. For example, a transmitting sidelink device (e.g., a UE) may transmit an initial sidelink transmission of a packet (or transport block) to one or more receiving sidelink devices (e.g., UEs) and a network coding device over a sidelink data channel (e.g., a PSSCH). The initial sidelink transmission may include a network coding request flag that requests the network coding device to initiate one or more sidelink retransmissions of the packet. The network coding device may then retransmit the packet, together with one or more other packets, to the one or more receiving UEs as a network coded sidelink transmission. The network coding device may be, for example, a roadside unit (RSU), another UE (including one of the receiving UEs), or a base station.

Various aspects relate to network coded sidelink communication using resources reserved for sidelink retransmission. In some aspects, a sidelink device can perform a network coded sidelink transmission without increasing resource overhead by using resources originally reserved for retransmission of a packet. The sidelink device can reuse the reserved resources when retransmission is not needed based on feedback of the initial sidelink transmission. In one aspect, the sidelink device can use reserved retransmission resources to transmit a network coded transmission of sidelink data received from other sidelink devices, for example, when the reserved retransmission resources are not needed for retransmitting the sidelink device's own sidelink data. In one aspect, the sidelink device can use the reserved retransmission resources to transmit a network coded transmission including a retransmission of the sidelink device's own sidelink data (e.g., NACK received) and sidelink data from other devices.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described implementations. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described implementations. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a random access network (RAN) 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. Of course, many other examples may be utilized within the scope of the present disclosure.

The geographic area, covered by the RAN 100 may be divided into cellular regions (cells) that can be uniquely identified by a user equipment (UE) based on an identification broadcasted from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (NB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station. In some examples, a base station can support both LTE, and 5G NR.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in cell 108 why may overlap with one or more macrocells. In this example, the cell may be referred to as a small cell (e.g., a macrocell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a quadcopter or drone. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote, unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The tern mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

In a further aspect of the RAN 100, sidelink signals may be used between UEs without necessarily relying on scheduling or control information from a base station. For example, two or more UEs (e.g., UEs 138, 140, and 142) may communicate with each other using peer-to-peer (P2P) or sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a P2P network, a device-to-device (D2D) network, vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 112 via D2D rinks (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. The exploitation of this redundancy in the encoded information message can improve the reliability of the message, enabling correction for any hit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SERF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 106 to the geographic area corresponding to a neighbor cell 102. When the signal strength or quality from the neighbor cell 102 exceeds that of its serving cell 106 for a given amount of time, the UE 124 may transmit a reporting message to its serving base station 116 indicating this condition. In response, the UE 124 may receive a handover command, and the UE may undergo a handover to the cell 102.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATS. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FRI (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" hand in various documents and articles. A similar nomenclature issue sometimes occurs with regard to FR2, which is often referred to (interchangeably) as a "millimeter wave" hand in documents and articles, despite being different from the extremely high frequency (EHF) band (30 GHz-300 GHz) which is identified by the international Telecommunications Union (ITU) as a "millimeter wave" band.

The frequencies between FR1 and FR2 are often referred to as mid-band frequencies. Recent 5G NR studies have identified an operating band for these mid-hand frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency hands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1 and/or FR5, or may be within the EHF band.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (TDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (FDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In order for transmissions over the radio access network 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G New Radio (NR) specifications, user data may be coded in various manners. Some data can be coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel coding techniques. Various implementations of scheduling entities and scheduled entities may include suitable hardware and capabilities (e.g., an encoder, a decoder, and/or a CODEC) to utilize one or more of these channel codes for wireless communication.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
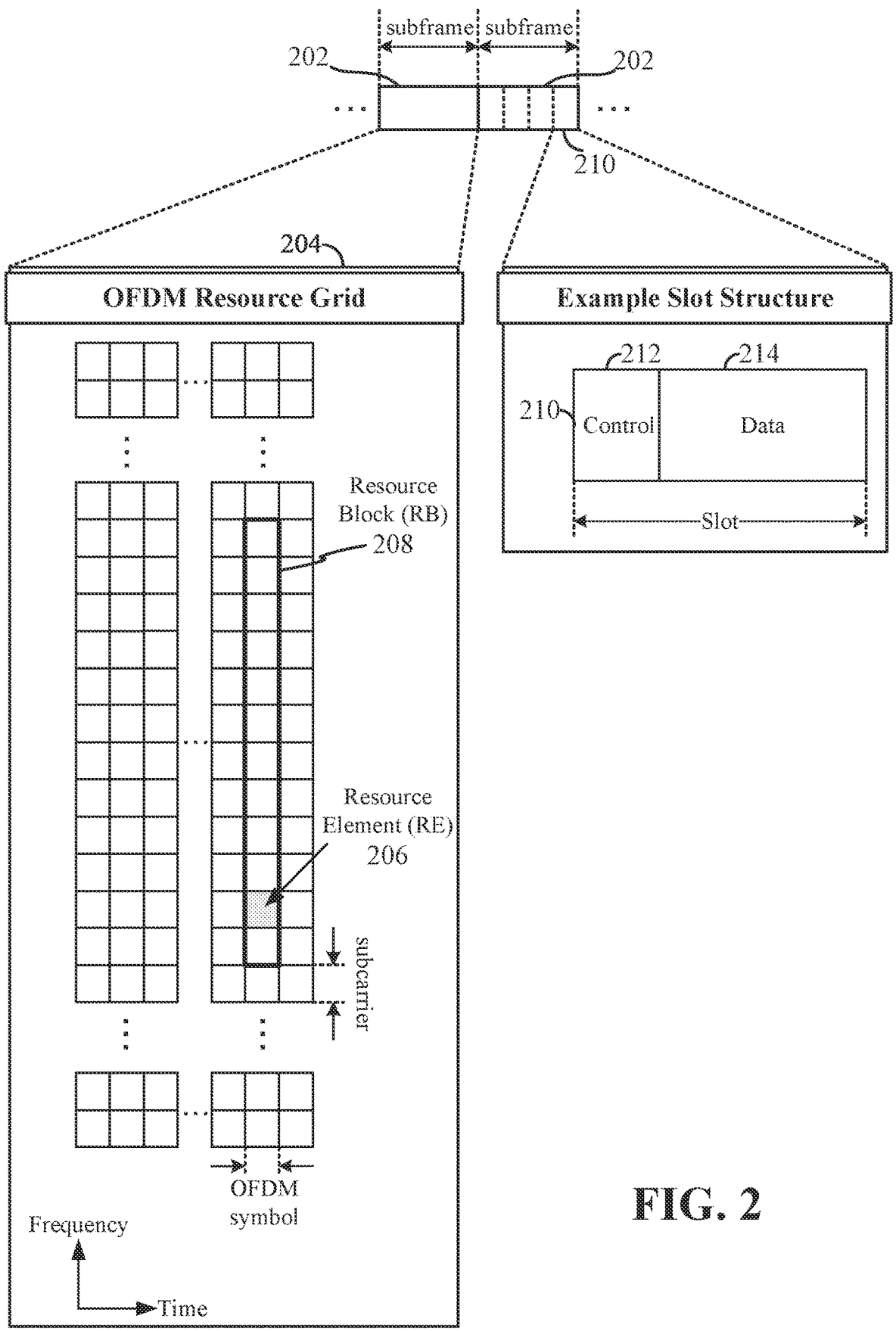
FIG. 2 is a schematic illustration of an organization of wireless resources in an air interface utilizing orthogonal frequency divisional multiplexing (OFDM) according to some aspects.

Referring now to FIG. 2, an expanded view of an exemplary subframe 202 is illustrated, showing an OFDM resource grid. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or snore REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a proximity service (Prose) PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE).

The data region 214 of the slot 210 may include a physical sidelink shared channel (PSSCH) including sidelink data traffic or payload transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CM-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIGS. 1 and 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
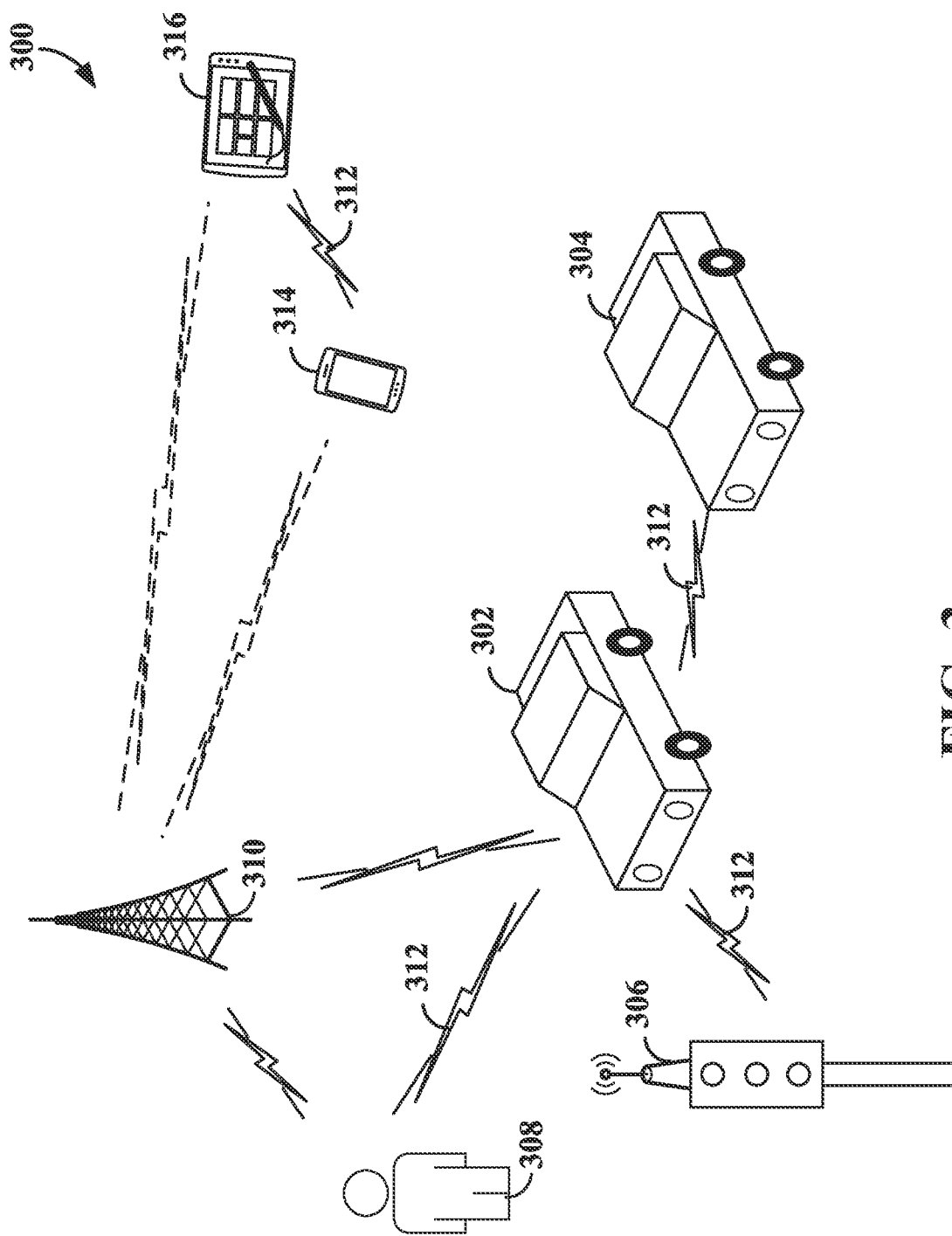
FIG. 3 is an illustration of an exemplary wireless communication network configured to support sidelink communication according to some aspects.

FIG. 3 illustrates an example of a wireless communication network 300 configured to support sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, sidelink communication may be implemented using LTE or NR communication.

Sidelink communication enables V2X devices (e.g., vehicles 302 and 304) to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such sidelink data may enable autonomous driving and improve road safety and traffic efficiency. For example, the exchanged sidelink data may be utilized by a connected vehicle (e.g., vehicles 302 and 304) to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, sidelink data received by a sidelink connected mobile device of a pedestrian/cyclist 308 may be utilized to trigger an audio alert (e.g., a warning sound), a tactile alert (e.g., vibration), a visual alert (e.g., flashing light), etc., in case of imminent danger (e.g., approaching vehicle).

The communication between vehicle-UEs (V-UEs) 302 and 304 or between a V-UE 302 or 304 and either an RSU 306 or a pedestrian-UE (P-UE) 308 may occur over a sidelink (or sidelink channel) 312 utilizing a proximity service (ProSe) PC5 interface. In various aspects of the disclosure, the PC5 interface may further be utilized to support D2D sidelink communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate sidelink communication between sidelink devices (e.g., V-UE 302 and V-UE 304) over the sidelink 312, two sidelink devices (e.g., V2X devices) may transmit discovery signals therebetween. In some examples, each discovery signal may include a synchronization signal, such as a primary synchronization signal (PSS) and/or a secondary synchronization signal (SSS) of a sidelink SSB that facilitates device discovery and enables synchronization of communication on the sidelink 312. For example, the discovery signal may be utilized by the V-UE 302 to measure the signal strength (e.g., signal-to-noise ratio (SNR), reference signal received power (RSRP)) and channel status of a potential sidelink (e.g., sidelink 312) with another UE (e.g., V-UE 304). The V-UE 302 may utilize the measurement results to select a UE (e.g., V-UE 304) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CC) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of retransmission resources reserved for one or more retransmissions of the sidelink transmission (e.g., the sidelink traffic/data). Thus, the SCI may include a respective PSSCH resource reservation and assignment for one or more retransmissions of the PSSCH. For example, the SCI may include a reservation message indicating the PSSCH resource reservation for the initial sidelink transmission (initial PSSCH) and one or more additional PSSCH resource reservations for one or more retransmissions of the PSSCH.

Figure 4:
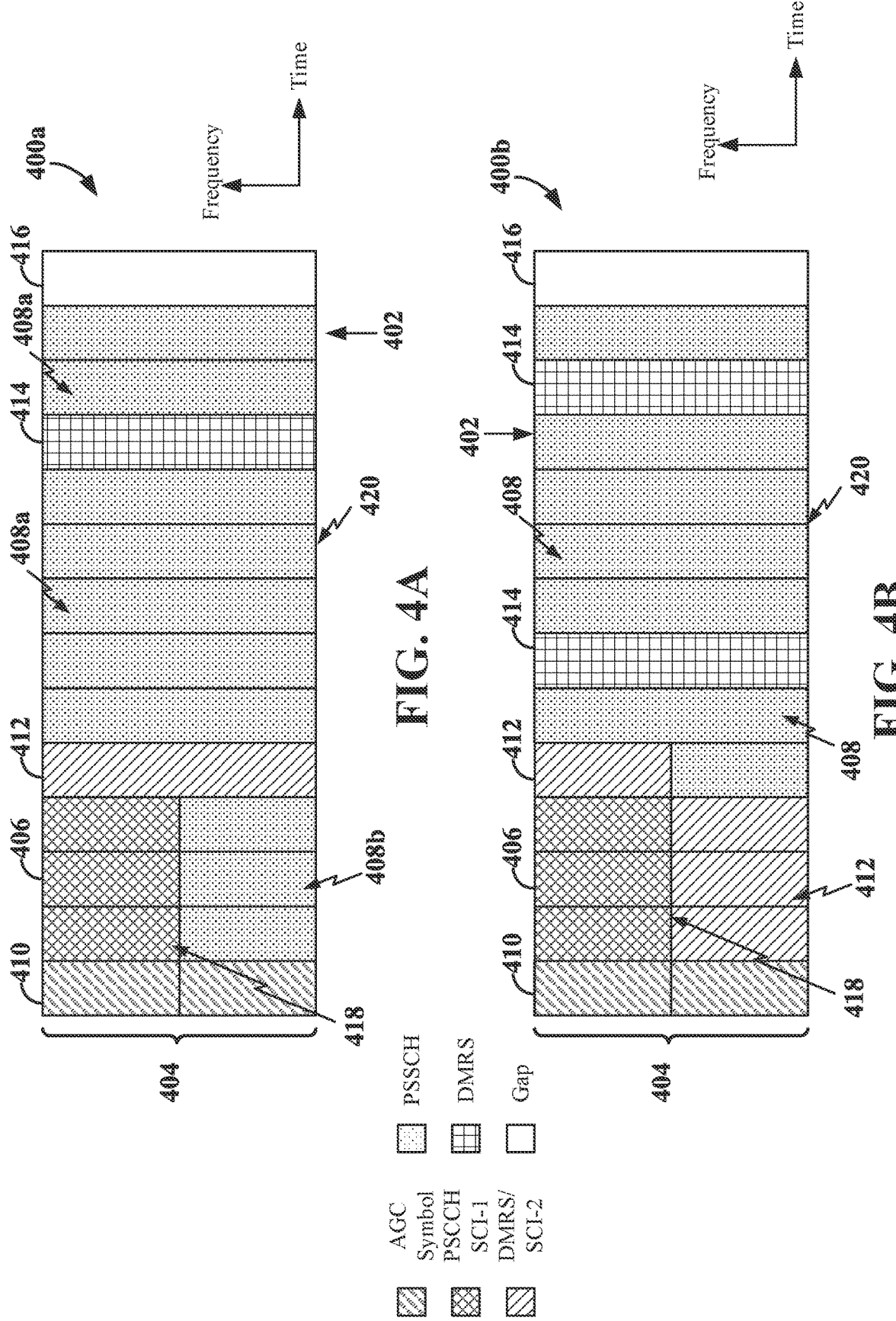
FIGS. 4A and 4B are diagrams illustrating examples of sidelink slot structures according to some aspects.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrates an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel. In each of the examples shown in FIGS. 4A and 4B, the starting symbol for the PSCCH 406 is the second symbol of the corresponding slot 400a or 400b and the PSCCH 406 spans three symbols 402. The PSCCH 406 may further include DMRSs.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., quadrature phase shift keying (QPSK), 16-QAM, 64-QAM and 256-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In some examples, the DMRSs 414 may be based on a Gold sequence and a configuration type 1 may be used for the frequency domain pattern of the PSSCH DMRSs 414. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2

412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
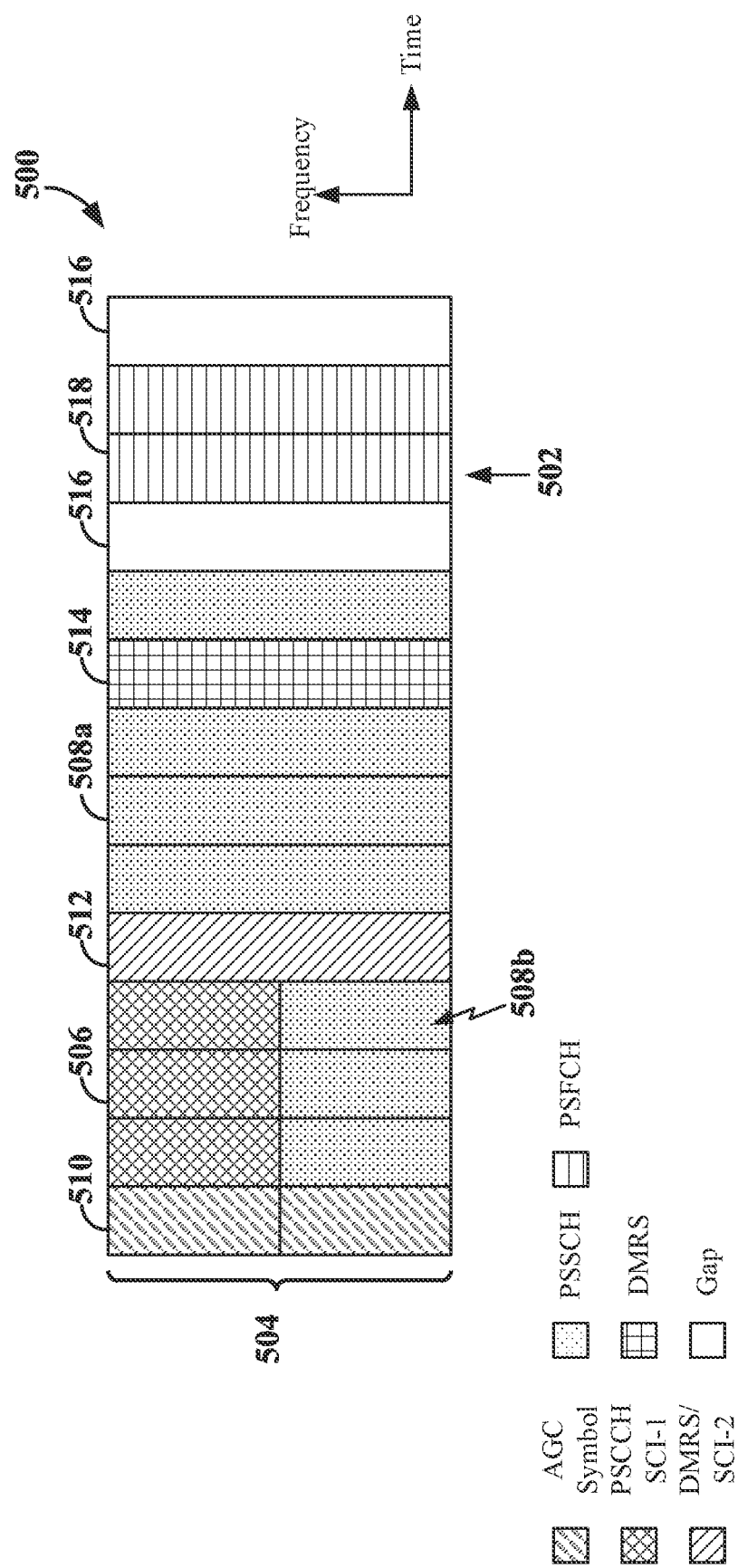
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region of the slot 500. The PSCCH 506 and PSSCH 508 are each transmitted on one or more symbols 502 of the slot 500. The PSCCH 506 includes, for example, SCI-1 that schedules transmission of data traffic on time-frequency resources of the corresponding PSSCH 508. As shown in FIG. 5, the starting symbol far the PSCCH 506 is the second symbol of the slot 500, and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In some examples, the DMRSs 514 may be based on a Gold sequence, and a configuration type 1 may be used for the frequency domain pattern of the PSSCH DMRSs 514. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508b may be transmitted on both the first symbol and the second symbol.

HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

In response to receiving a NACK, the transmitting LIE may send a HARQ retransmission, which may implement chase combining (HARQ-CC) or incremental redundancy (HARQ-IR). In HARQ-CC, a retransmitted encoded code block (e.g., an encoded packet) is identical to the original transmission. That is, if an encoded code block is not decoded properly at the receiving sidelink device, resulting in a HACK, then the transmitting sidelink device may retransmit the full encoded code block including identical information to the original transmission. The information may then ideally be obtained error-free by virtue of a process called soft combining, where the redundant bits from the retransmission may be combined before decoding to increase the probability of correct reception of each bit. On the other hand, in HARQ-IR, the retransmitted encoded code block may be different from the originally transmitted encoded code block, and further, if multiple retransmissions are made, each retransmission may differ from one another. Here, retransmissions may include different sets of coded bits; for example, corresponding to different code rates or algorithms; corresponding to different portions of the original code block, some of which may not have been transmitted in the original transmission; corresponding to forward error correction (FEC) bits that were not transmitted in the original transmission; or other suitable schemes. As with HARQ-CC, here, the information may be obtained error-free by utilizing soft combining to combine the retransmitted bits with the original transmitted bits.

Network-Coded Transmission

Figure 6:
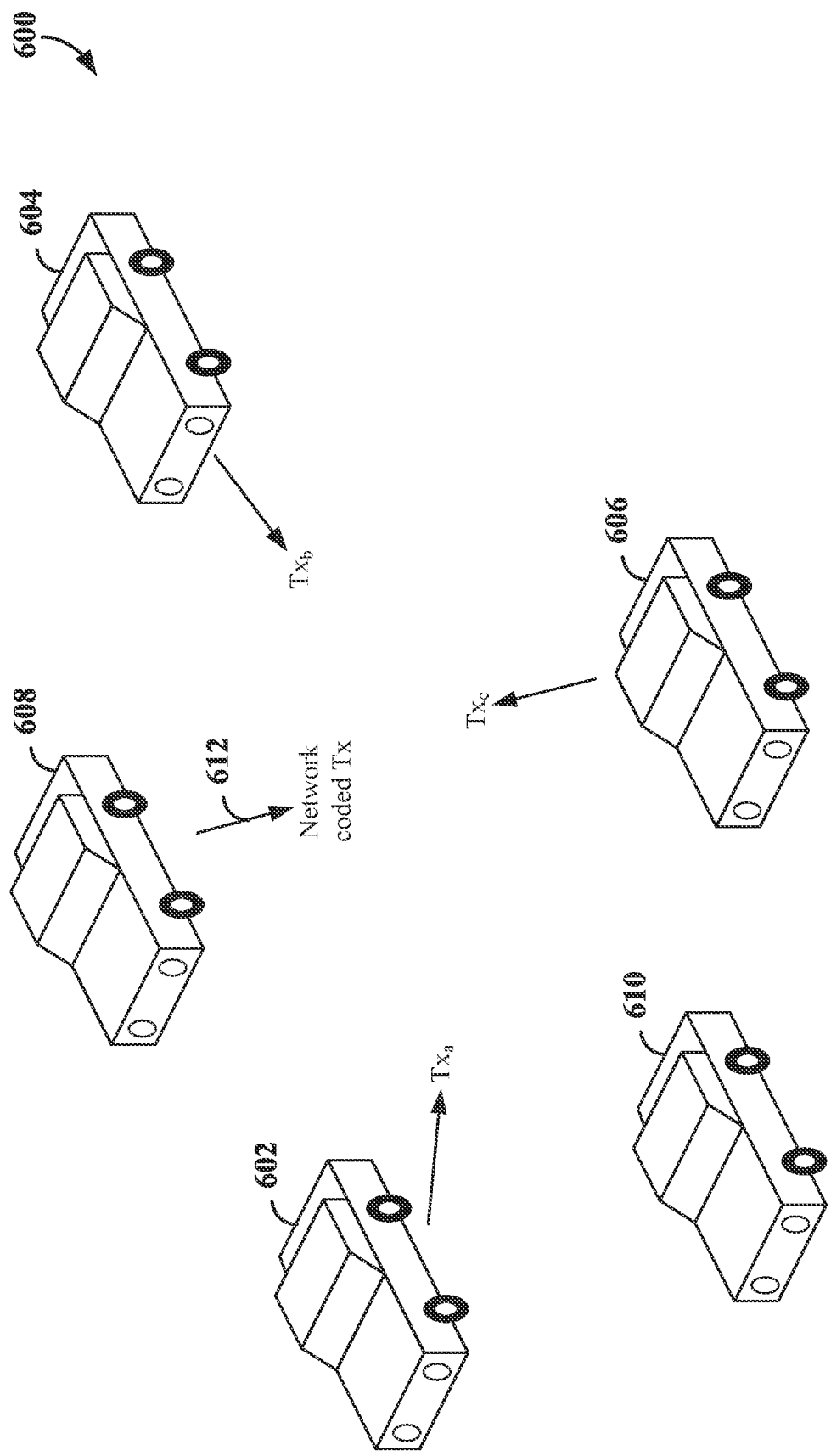
FIG. 6 is a diagram illustrating an example of network coded sidelink transmission using in a sidelink network according to some aspects.

FIG. 6 is a diagram illustrating an example of a network coded transmission in a sidelink network 600 according to some aspects. Although UEs 602-610 are illustrated as V-UEs, each of the UEs 602-610 may correspond to any of the UEs, sidelink devices, D2D devices, or other scheduled entities illustrated in FIGS. 1 and/or 3.

In the example shown in FIG. 6, the transmitting UE 602 can transmit a first initial sidelink transmission $Tx_a$ to the receiving UEs 604 and 606. In addition, the transmitting UE 604 can transmit a second initial sidelink transmission $Tx_b$ to the receiving UEs 602 and 606. Further, the transmitting UE 606 can transmit a third initial sidelink transmission $Tx_c$ to the receiving UEs 602 and 604. In some examples, each of the initial sidelink transmissions (e.g., $Tx_a$, $Tx_b$, and $Tx_c$) may be groupcast or broadcast transmissions.

If the first initial sidelink transmission $Tx_a$ is successfully received and decoded by the receiving UE 606, the receiving UE may transmit an ACK (or not transmit a NACK) to the transmitting UE 602. However, the first initial sidelink transmission $Tx_a$ may not be successfully received and decoded by the receiving UE 604, resulting in the UE 604 transmitting a NACK to the transmitting UE 602. Similarly, if the second initial sidelink transmission $Tx_b$ is successfully received and decoded by the receiving UE 602, the receiving UE may transmit an ACK (or not transmit a NACK) to the transmitting UE 604. However, the second initial sidelink transmission $Tx_b$ may not be successfully received and decoded by the receiving UE 606, resulting in the receiving UE 606 transmitting a NACK to the transmitting UE 604. Similarly, if the third initial sidelink transmission $Tx_c$ is successfully received and decoded by the receiving UE 602, the receiving UE 602 may transmit an ACK (or not transmit a NACK) to the transmitting UE 606. However, the third initial sidelink transmission $Tx_c$ may not be successfully received and decoded by the receiving UE 604, resulting in the receiving UE 604 transmitting a NACK to the transmitting UE 606.

Each of the above described initial sidelink transmissions $Tx_a$, $Tx_b$, and $Tx_c$ may further be received by other sidelink devices (e.g., UE 608 and 610). For example, the sidelink device 608 may be an RSU, another UE, or a base station (e.g., gNB). In one example, each of the initial sidelink transmissions $Tx_a$, $Tx_b$, and $Tx_c$ may include a network coding request flag requesting network coding of the respective sidelink transmissions $Tx_a$, $Tx_b$, and $T_c$ by the sidelink device 608 that may be referred to as a network coding device in this disclosure. Upon successfully receiving and decoding the initial sidelink transmissions $Tx_a$, $Tx_b$, and $Tx_c$. The network coding device 608 may transmit a respective network coding accept message to each of the transmitting UEs. The network coding accept messages may correspond, for example, to an ACK of the sidelink transmissions $Tx_a$, $Tx_b$, and $Tx_c$. The network coding device 608 may then initiate one or more retransmissions of the sidelink transmissions $Tx_a$, $Tx_b$, and $Tx_c$. In some examples, the network coding device 608 may initiate sidelink retransmissions of $Tx_a$, $Tx_b$, and $Tx_c$ regardless of whether one or more of the receiving UEs NACK'ed one or more of the initial sidelink transmissions $Tx_a$, $Tx_b$, and $Tx_c$. In other examples, the network coding device 608 may initiate sidelink retransmissions upon receiving at least one NACK of any of the initial sidelink transmissions $Tx_a$, $Tx_b$, and $Tx_b$.

The network coding device 608 may be configured to retransmit the sidelink transmissions $Tx_a$, $Tx_b$, and $Tx_c$. In a network coded sidelink transmission 612. In some examples, the network coded sidelink transmission 612 may correspond to an encoding function (e.g., $f(Tx_a, Tx_b, Tx_c)$) of each of the initial sidelink transmissions. One example of encoding function is erasure encoding (e.g., XOR). The receiving UEs 602, 604, and/or 606 may receive the network coded sidelink transmission 612 and attempt to decode the initial sidelink transmission(s) (e.g., $Tx_a$, $Tx_b$, and/or $Tx_c$) based on the network coded sidelink transmission 612. For example, the receiving UE 606 may be able to decode $Tx_b$ from the network coded sidelink transmission ($f(Tx_a, Tx_b, Tx_c)$) and the originally decoded initial sidelink transmission $Tx_a$. In addition, the receiving UE 606 may be able to decode $Tx_a$ from the network coded sidelink transmission ($f(Tx_a, Tx_b, Tx_c)$) and the originally decoded initial sidelink transmission $Tx_b$.

For example, with erasure coding, a receiving UE may recover an erased, lost, or incorrectly decoded transmission by summing the other correctly decoded transmissions. For example, if the network coded sidelink transmission corresponds to $Tx_a \oplus Tx_b \oplus Tx_c$ ($\oplus$ is an XOR operator) and the receiving UE previously correctly decoded $Tx_a$ and $Tx_c$, the receiving UE can recover the erased $Tx_b$ by summing $Tx_a$ and $Tx_c$ with the network coded sidelink transmission $Tx_a \oplus Tx_b \oplus Tx_c$ as follows $Tx_a \oplus Tx_c (Tx_a \oplus Tx_b \oplus Tx_c)$.

The network coding device 608 may utilize any type of coding for encoding the network coded sidelink transmission. By way of example, but not limitation, the network coding device 608 may utilize turbo coding, low density parity check (LDPC) coding, polar coding, or convolutional coding for channel coding. For network coding or outer coding, the network coding device 608 may use erasure coding. In some aspects, outer coding, erasure coding, and network coding may be used interchangeably in this disclosure.

Sidelink Resource Reservation

In a 5G NR network (e.g., RAN 100), a UE may signal to one or more other UE(s) using SCI that includes sidelink resource reservations. For example, a sidelink resource allocation (e.g., frequency and/or time domain resources) can be in units of sub-channels in the frequency domain and one slot in the time domain. The UE can reserve sidelink resources (e.g., each sidelink resource corresponding to one time slot and one sub-sub-channel) from a resource pool that includes communication resources allocated for sidelink transmission (e.g., configured by a scheduling entity or gNB).

Figure 7A:
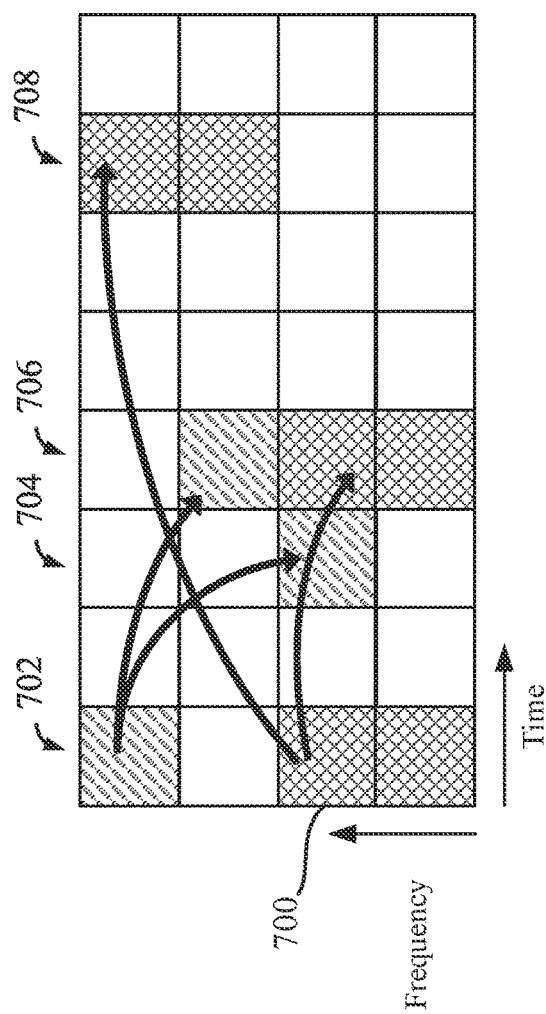
FIGS. 7A and 7B are diagrams illustrating examples of sidelink resource reservation according to some aspects.

For example, in FIG. 7A, a UE can reserve sidelink resources in a current slot 702 and up to two future slots (e.g., slots 704, 706, and 708). Both aperiodic and periodic resource reservations can be used in an NR sidelink network. The reserved resources can be used for the transmission of one or more transport blocks or packets (e.g., sidelink data) using one or more slots.

Figure 7B:
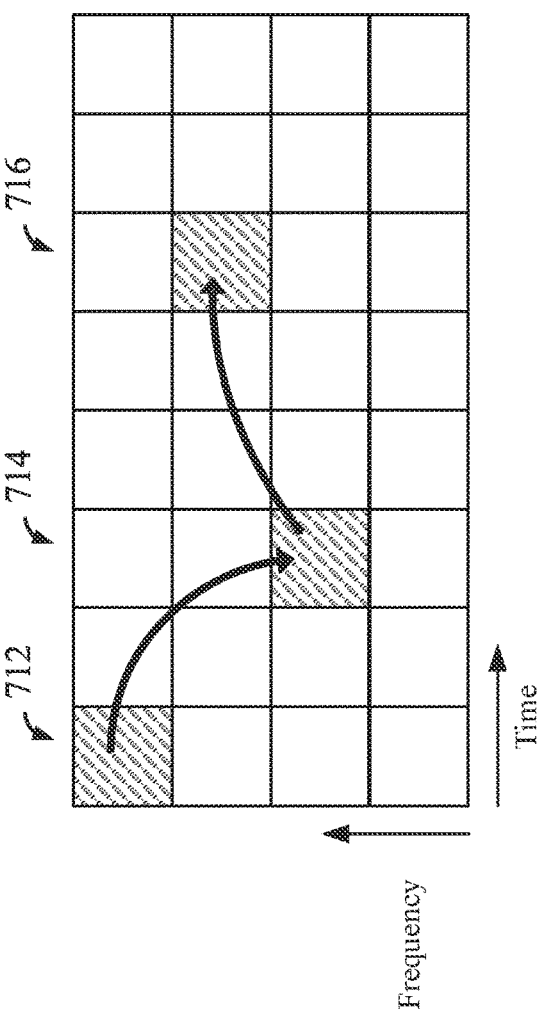

In some aspects, in FIG. 7B, a UE can reserve resources that are chained in time (e.g., frequency resources in time slots 712, 714, and 716) for the initial transmission of a transport block (TB) (e.g., in slot 712) and one or more re-transmission(s) of the TB (e.g., in slots 714 and 716) if needed. In some examples, the UE may be configured or preconfigured with a maximum number of retransmissions of a TB (e.g., sidelink data). Once the maximum number of retransmissions is reached, the UE can stop retransmission of the sidelink data. In some aspects, based on the feedback of sidelink data, (e.g., ACK or NACK received for a transport block (TB)), the UE may stop retransmission of the sidelink data, for example, when the UE received an ACK for the sidelink data. In the examples above, the resources scheduled for one or more of the retransmissions may be unused (e.g., ACK received for the sidelink data, so the maximum number of retransmissions is not reached). In various aspects, one or more of the resources reserved for a retransmission may be utilized or repurposed to transmit a network coded transmission with or without including a retransmission of the initial sidelink data for which the resources are originally reserved. That can improve sidelink resource usage efficiency in sidelink communication between the UEs.

Figure 8:
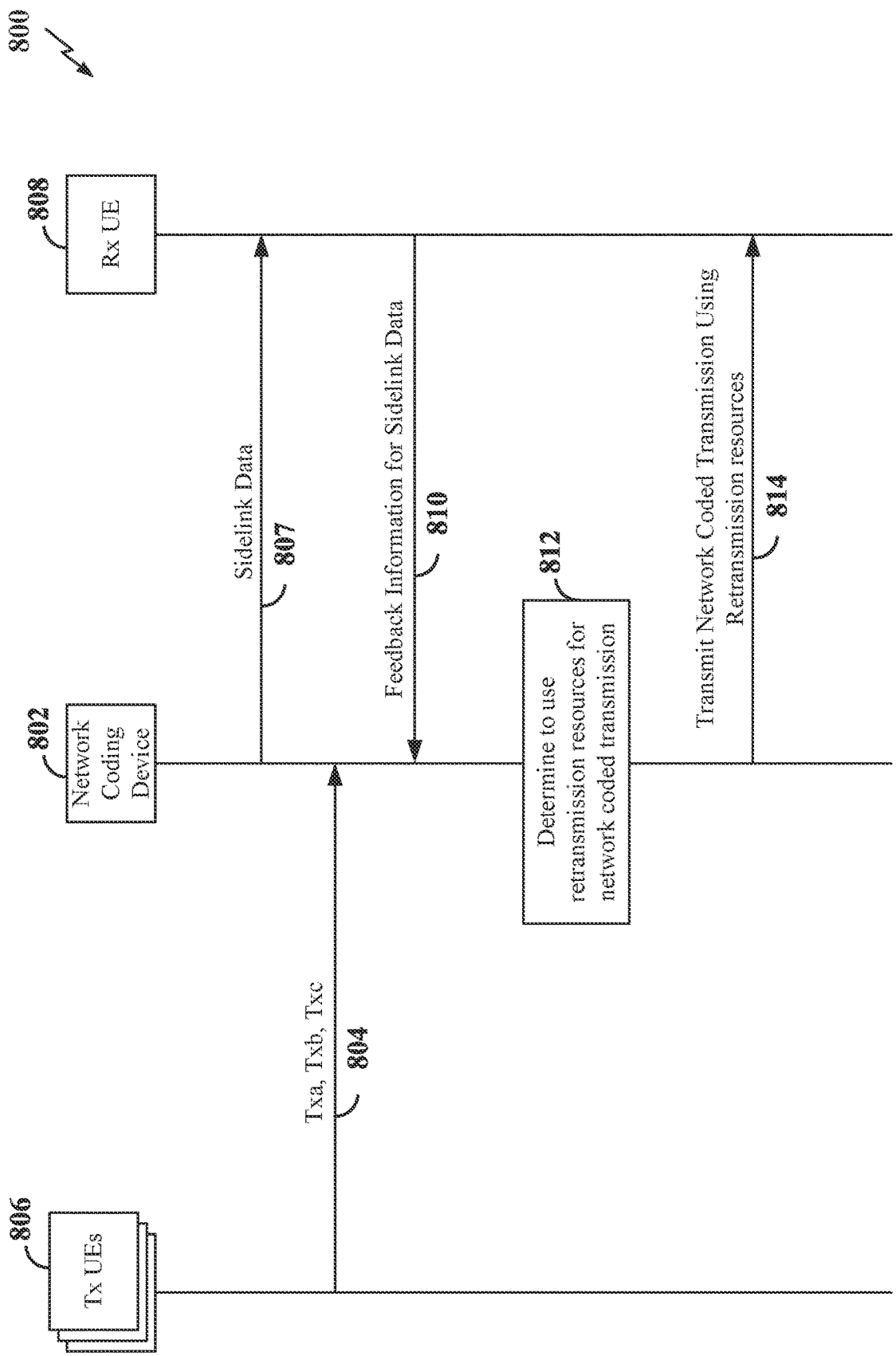
FIG. 8 a diagram illustrating an example of sidelink communication between a network coding device and other sidelink devices according to some aspects.

FIG. 8 is a diagram illustrating an example of sidelink communication between a network coding device and other sidelink devices according to some aspects. In one example, a network coding device 802 (e.g., UE 608) may receive sidelink transmissions 804 (e.g., $Tx_a$, $Tx_b$, $Tx_c$) from other sidelink devices 806 (e.g., UE 602, 604, 606). The network coding device 802 may also transmit its own sidelink data 807 to a receiving UE 808, and receive feedback information 810 for the sidelink data 807. For example, the network coding device 802 can use sidelink resources 900 and 902 to transmit the sidelink data 807. If the feedback information 810 (e.g., feedback 906 in FIG. 9) is an ACK indicating that the sidelink data 807 is successfully received by the UE 808, retransmission is not needed. If the feedback information 810 (e.g., feedback 906 in FIG. 9) is a NACK indicating that the sidelink data 807 is not successfully received by the UE 808, retransmission is not needed. In some examples, the lack of a feedback from UE 808 can indicate a NACK.

At 812, the network coding device 802 can determine to use retransmission resources for a network coded transmission (e.g., $f(Tx_a, Tx_b, Tx_c)$) based on the feedback information 810 of the sidelink data 807. In one example, if retransmission of sidelink data 807 is not needed (e.g., ACK received), the network coding device 802 can use a sidelink resource (e.g., resource 904 in FIG. 9), which is originally reserved for retransmitting sidelink data 807, to perform a network coded sidelink transmission 814. In another example, if retransmission of sidelink data 807 is still needed (e.g., NACK received) after a predetermined number of retransmissions of the sidelink data 807, the network coding device 802 can use a retransmission resource (e.g., resource 904 in FIG. 9) to perform the network coded sidelink transmission 814 that may also include a retransmission of the sidelink data 807. The predetermined number of retransmissions can be specified in the communication standards (e.g., 5G NR) that governs the sidelink communication between the devices, predefined (e.g., configured or preconfigured at the devices), or based on a priority of the sidelink data 807 and/or other sidelink data (e.g., $Tx_a$, $Tx_b$, $Tx_c$). In some aspects, the UE can choose to transmit network coded sidelink data when the predetermined number of retransmissions is reached. Here, the predetermined number of retransmissions is less than the maximum number of retransmissions of the sidelink data 807.

Such repurposing of reserved sidelink resources can reduce the overhead of sidelink resource usage for performing network coded sidelink transmission. For example, the network coding device 802 can reserve sidelink resources in a current slot (e.g., resource 900) for the initial transmission of certain sidelink data (e.g., a TB) and resources in one or more subsequent slots for one or more retransmissions of the sidelink data, if needed. When the initial sidelink data is transmitted successfully in the first slot, the reserved sidelink resources in the future slots can be repurposed for a network coded sidelink transmission. In one aspect, when two or more reserved resources are available for reuse, the network coding device 802 can select the earlier resource for the network coded transmission, and the later resource(s) can be released either implicitly or explicitly. In one aspect, when two or more reserved resources are available for reuse, the network coding device 802 can use all of available reserved resources for network coded transmissions (e.g., a first network coded transmission can be transmitted in the first available reserved resource and a second network coded transmission can be transmitted in the second available reserved resources). In one aspect, when two or more reserved resources are available for reuse, the network coding device 802 can select one or more of the reserved resources based on a predetermined configuration or a packet priority of the sidelink data to be included in the networked coded transmission.

In some aspects, the number of encoded packets or TBs within a network coded transmission can be specified (e.g., in communication standards like 5G NR), configured (e.g., preconfigured) at the network coding device, or determined by the implementation of the network coding device. In one aspect, the number of packets or TBs within a network coded transmission can be determined based on the priority (e.g., minimum/maximum packet priority) of the retransmitted sidelink data (e.g., network coding device's own data and/or sidelink data of other devices). In some aspects, the encoding scheme or number of recoverable erasures of a network coded transmission may be specified (e.g., in communication standards like 5G NR), configured (e.g., preconfigured) at the network coding device, or determined by the implementation of the network coding device. In one aspect, the encoding scheme or number of recoverable erasures of a network coded transmission can be determined based on the priority (e.g., minimum/maximum packet priority) of the retransmitted sidelink data (e.g., network coding device's own data and/or sidelink data of other devices).

Figure 10:
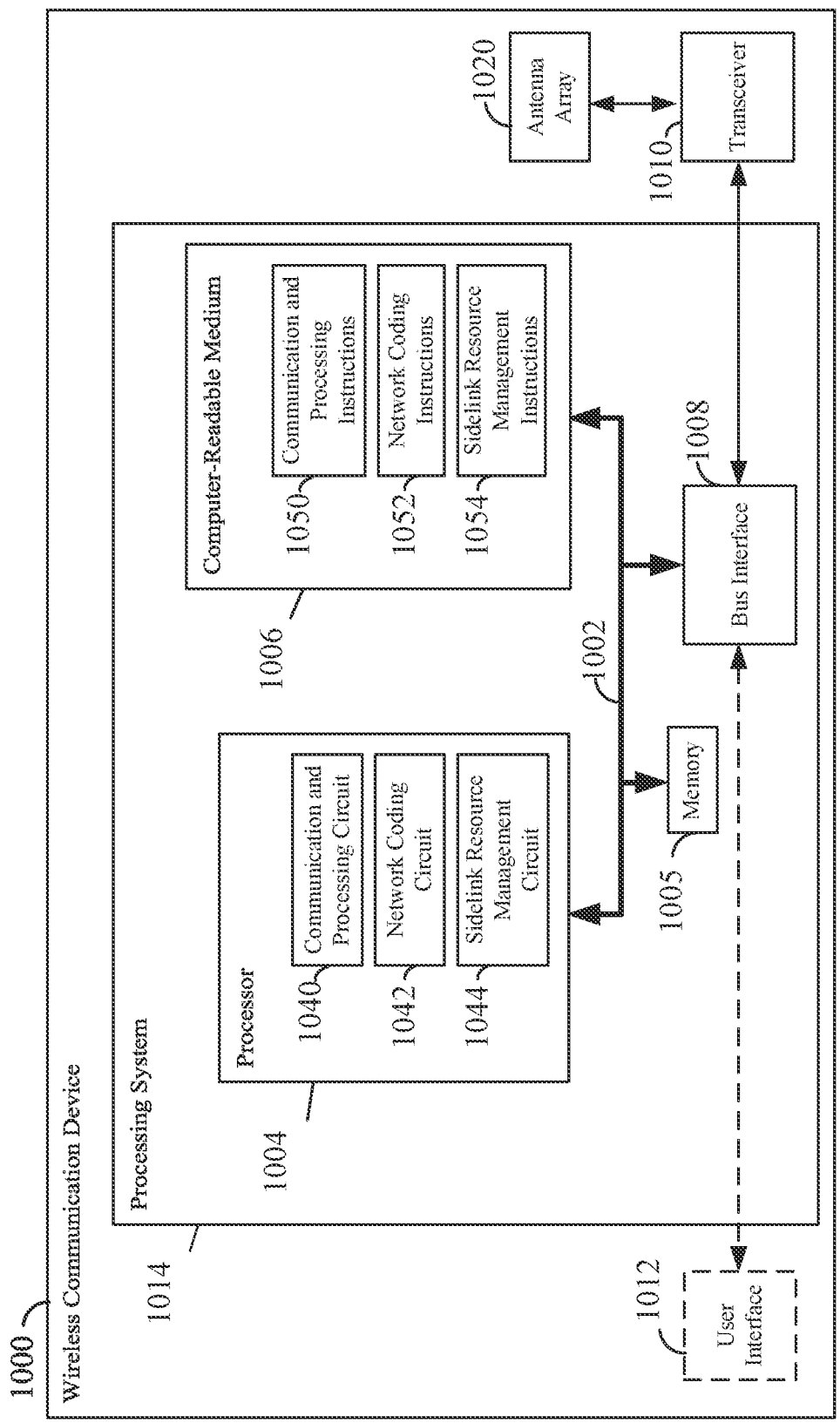
FIG. 10 is a block diagram illustrating an example of a hardware implementation for a wireless communication device according to some aspects.

FIG. 10 is a block diagram illustrating an example of a hardware implementation for a wireless communication device 1000 employing a processing system 1014. For example, the wireless communication device 1000 may be a user equipment (UE) or sidelink device as illustrated in any one or more of FIGS. 1, 3, 6, and/or 8.

The wireless communication device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1000 may be configured to perform any one or more of the functions described herein. That is, the processor 1004, as utilized in a wireless communication device 1000, may be used to implement any one or more of the processes and procedures described below and illustrated in FIGS. 11-13.

The processor 1004 may in some instances be implemented via a baseband or modem chip and in other implementations, the processor 1004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010, connected to an antenna array 1020, can provide a communication interface or means for communicating with various other apparatus over a transmission medium. Depending upon the nature of the apparatus, a user interface 1012 (e.g., keypad, display, speaker, microphone, joystick, touchscreen) may also be provided. Of course, such a user interface 1012 is optional, and may be omitted in some examples, such as a base station.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions, including, for example, network coded sidelink transmission using resources reserved for retransmission. In some aspects of the disclosure, the processor 1004 may include communication and processing circuitry 1040 configured for various functions, including for example communicating with network entities (e.g., a scheduling entity or gNB) and other UEs or sidelink devices. In some examples, the communication and processing circuitry 1040 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1040 may include one or more transmit/receive chains. In addition, the communication and processing circuitry 1040 may be configured to transmit and process uplink traffic and uplink control messages, receive and process downlink traffic and downlink control messages. The communication and processing circuitry 1040 may also be configured to transmit/receive and process sidelink traffic and control messages.

In one example, the communication and processing circuitry 1040 may be configured to transmit network coded sidelink data using resources reserved for retransmission when one or more of the reserved resources become available or unused for retransmission. In one example, the communication and processing circuitry 1040 can be configured to retransmit sidelink data received from other sidelink device(s) using a network coded sidelink transmission (e.g., erasure coding).

The communication and processing circuitry 1040 may further be configured to execute communication and processing software 1050 stored on the computer-readable medium 1006 to implement one or more functions described herein.

In some implementations where the communication involves receiving information, the communication and processing circuitry 1040 may obtain information from a component of the wireless communication device 1000 (e.g., from the transceiver 1010 that receives the information via radio frequency signaling or some other type of signaling suitable for the applicable communication medium), process (e.g., decode) the information, and output the processed information. For example, the communication and processing circuitry 1040 may output the information to another component of the processor 1004, to the memory 1005, or to the bus interface 1008. In some examples, the communication and processing circuitry 1040 may receive one or more of signals, messages, other information, or any combination thereof. In some examples, the communication and processing circuitry 1040 may receive information via one or more channels. In some examples, the communication and processing circuitry 1040 may include functionality for a means for receiving. In some examples, the communication and processing circuitry 1040 may include functionality for a means for processing, including a means for demodulating, a means for decoding, etc.

In some implementations where the communication involves sending (e.g., transmitting) information, the communication and processing circuitry 1040 may obtain information (e.g., from another component of the processor 1004, the memory 1005, or the bus interface 1008), process (e.g., modulate, encode, etc.) the information, and output the processed information. For example, the communication and processing circuitry 1040 may output the information to the transceiver 1010 (e.g., that transmits the information via radio frequency signaling or some other type of signaling suitable for the applicable communication medium). In some examples, the communication and processing circuitry 1040 may send one or more of signals, messages, other information, or any combination thereof. In some examples, the communication and processing circuitry 1040 may send information via one or more channels. In some examples, the communication and processing circuitry 1040 may include functionality for a means for sending (e.g., a means for transmitting). In some examples, the communication and processing circuitry 1040 may include functionality for a means for generating, including a means for modulating, a means for encoding, etc.

In some aspects of the disclosure, the processor 1004 may include network coding circuitry 1042 configured for various functions, including for example network encoding. In one aspect, the network coding circuitry 1042 can be configured to encode sidelink data (e.g., packets or TB) that are received from other sidelink device(s). For example, the network coding circuitry 1042 can be configured to encode sidelink data using any suitable coding schemes to enhance reliability of data transmission. For example, the network coding circuitry 1042 can be configured to combine multiple TBs (or packets) using network coding (e.g., utilizing a function, such as erasure coding) to produce a network coded transmission. Then the communication and processing circuitry 1040 can encode this network coded transmission, for example, using any type of channel coding, such as LDPC coding, Polar coding, Turbo coding, etc. In one example, the network coding circuitry 1042 can encode sidelink data using erasure coding (e.g., XOR and Reed-Solomon) that can correct one or more erasures at the receiver. The network coding circuitry 1042 may further be configured to execute network coding software 1052 stored on the computer-readable medium 1006 to implement one or more functions described herein.

In some aspects of the disclosure, the processor 1004 may include sidelink resource management circuitry 1044 configured for various functions, including for example sidelink resources management. In one aspect, the sidelink resource management circuitry 1044 can be configured to reserve communication resources (e.g., time-domain and frequency-domain resources) for transmitting sidelink data. In one example, the sidelink resource management circuitry 1044 can further be configured to reserve resources for retransmitting sidelink data when it is needed or permitted. In one example, the sidelink resource management circuitry 1044 can be configured to repurpose the reserved retransmission resources when one or more of the resources are not needed for retransmitting sidelink data. In one example, the sidelink resource management circuitry 1044 can be configured to use available or unused sidelink resources for network coded sidelink transmission. In one example, the sidelink resource management circuitry 1044 can use the reserved retransmission resources for network coded transmissions even when a HACK is received for sidelink data. In this case, the sidelink resource management circuitry 1044 can combine its own retransmission with other retransmissions (received from other UEs) in a network coded transmissions. The sidelink resource management circuitry 1044 may further be configured to execute sidelink resource management software 1054 stored on the computer-readable medium 1006 to implement one or more functions described herein.

Figure 11:
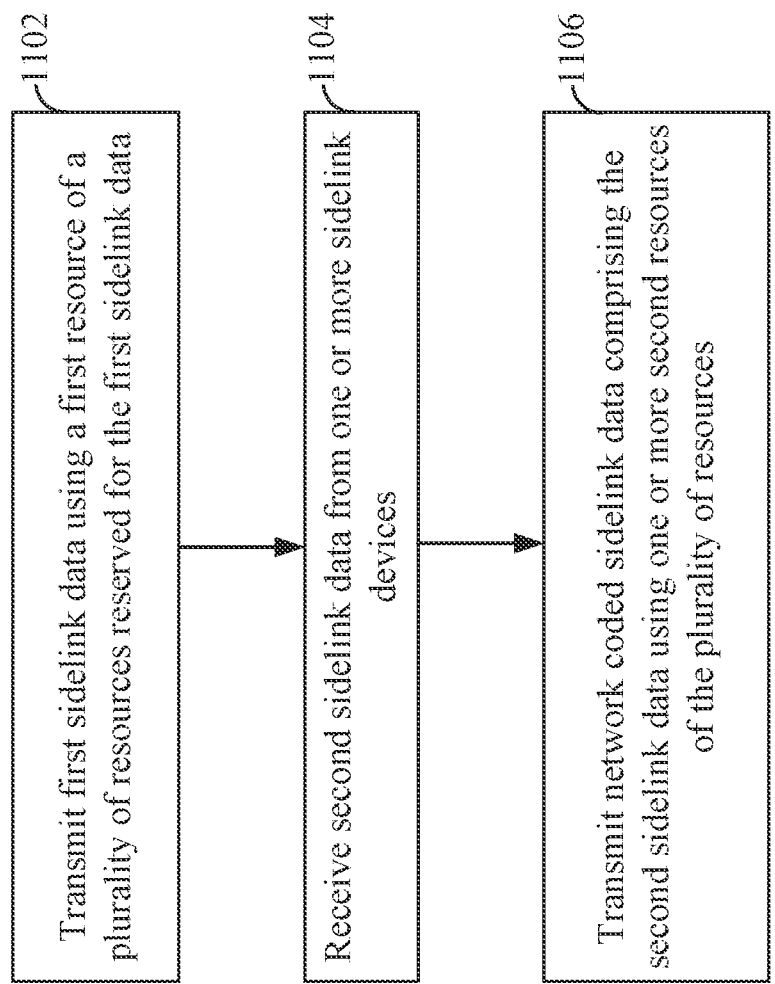
FIG. 11 is a flow chart illustrating an exemplary process for network coded sidelink transmission using resources reserved for sidelink retransmission according to some aspects.

FIG. 11 is a flow chart illustrating an exemplary process 1100 for network coded sidelink transmission using resources reserved for sidelink data, retransmission according to some aspects. As described below, some or all illustrated features may be omitted in a particular implementation within the scope of the present disclosure, and some illustrated features may not be required for all implementations. In some examples, the process 1100 may be carried out by any of the UEs illustrated in FIGS. 3, 6, and 8. In some examples, the process 1100 may be carried out by any suitable apparatus or means for carrying out the functions or algorithm described below.

At block 1102, a UE (e.g., UE 1000) can transmit first sidelink data using a first resource of a plurality of resources reserved for the first sidelink data. In one example, the communication and processing circuitry 1040 can provide a means to transmit the first sidelink data via the transceiver 1010 and the antenna array 1020. In one example, the sidelink resource management circuitry 1044 can provide a means to reserve the sidelink resources for the first sidelink data (e.g., sidelink packet or TB originated from the UE). The reserved resources may be similar to the sidelink resources described above in relation to FIG. 9. In one example, the UE can transmit the first sidelink data (e.g., initial transmission of the first sidelink data) using resources (e.g., time-domain and frequency-domain resources) reserved in a first slot and if needed retransmit the first sidelink data (e.g., retransmission of the first sidelink data) using resources of the plurality of resources in future slots. For example, the UE may receive no feedback or a NACK for the first sidelink data.

At block 1104, the UE can receive second sidelink data from one or more sidelink devices. For example, the second sidelink data may be an initial transmission of sidelink data (e.g., sidelink transmissions $Tx_a$, $Tx_b$, and $Tx_c$) from other sidelink devices (e.g., UEs 602, 604, and 606 of FIG. 6). In one example, the communication and processing circuitry 1040 can provide a means to receive the second sidelink data via the transceiver 1010 and the antenna array 1020.

At block 1106, the UE can transmit network coded sidelink data including the second sidelink data using one or more second resources of the plurality of resources. In one example, the communication and processing circuitry 1040 can provide a means to transmit the network coded sidelink data via the transceiver 1010 and the antenna array 1020. In one aspect, the network coding circuitry 1042 can provide a means to encode the second sidelink data for network coded sidelink transmission. For example, the network coding circuitry 1042 can encode the second sidelink data using erasure coding (e.g., XOR coding). In some aspects, the sidelink resource management circuitry 1044 can provide a means to determine that one or more of the resources reserved for retransmission of the first sidelink data are not needed based on the feedback of the first sidelink data. For example, the UE can receive an ACK for the first sidelink data from one or more sidelink devices (e.g., UE 602, 604, and 606 of FIG. 6). In one aspect, when two or more reserved resources in different time slots are available for network coded sidelink transmission, the UE can use the resource in the earlier slot for the network coded sidelink transmission of the second sidelink data, and the resource in the later slot(s) can be released for other uses.

In another aspect, the UE can use two or more available reserved resources in different time slots for network coded sidelink transmission. In one example, the UE can encode different second sidelink data (e.g., different TBs) in each network coded sidelink transmission. In another example, the UE can encode the same TBs in two network coded sidelink transmissions using a dual-erasure correcting code to enhance the reliability of the transmitted TBs as compared to when a single-erasure correcting code (e.g., XOR) is used. In some aspects, the UE can determine whether to use one or more reserved resources for network coded sidelink transmission based on a packet priority of the second sidelink data. For example, if the priority of the second sidelink data is high, the UE can use more resources for network coded sidelink transmission to increase the reliability of the transmission.

Figure 12:
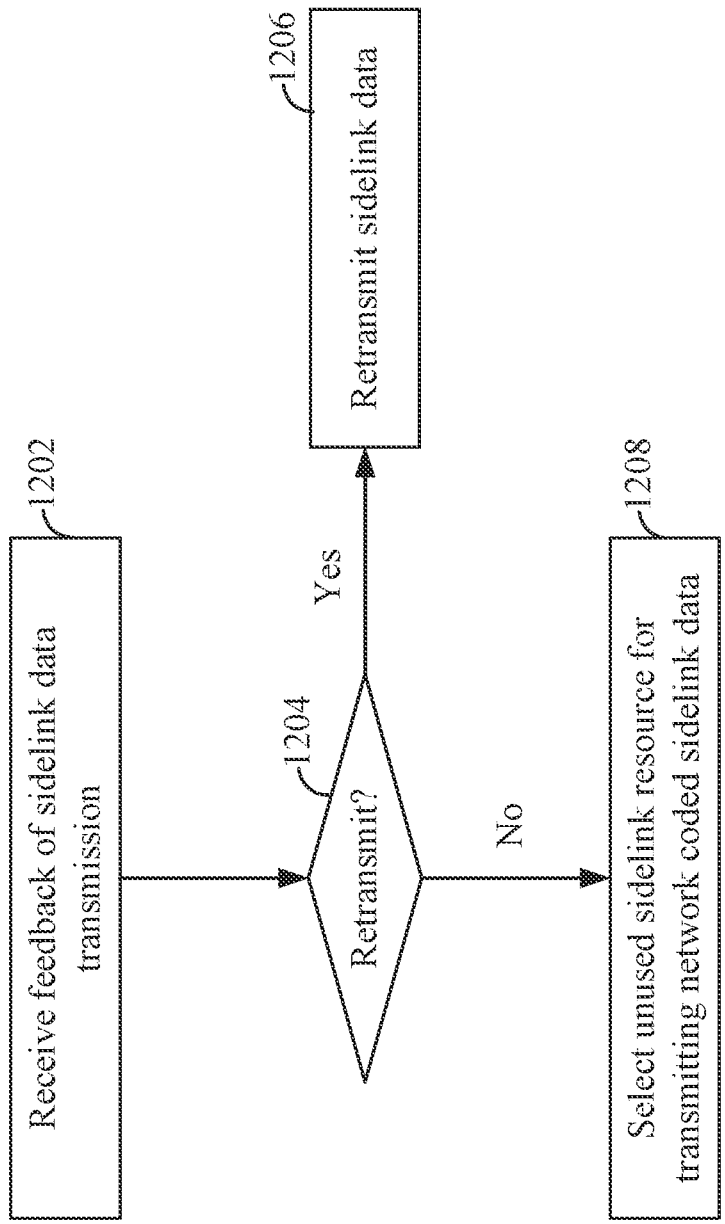
FIG. 12 is a flow chart illustrating an exemplary process for controlling network coded sidelink transmission based on sidelink feedback according to some aspects.

FIG. 12 is a flow chart illustrating an exemplary process 1200 for controlling network coded sidelink transmission using resources originally reserved for sidelink data retransmission according to some aspects. As described below, some or all illustrated features may be omitted in a particular implementation within the scope of the present disclosure, and some illustrated features may not be required for all implementations. In some examples, the process 1200 may be carried out by any of the UEs illustrated in FIGS. 6, 8, and 10. In some examples, the process 1200 may be carried out by any suitable apparatus or means for carrying out the functions or algorithm described below. In some aspects, a UE can use the process 1200 to determine when to transmit a network coded sidelink transmission based on the feedback received for sidelink data.

Figure 9:
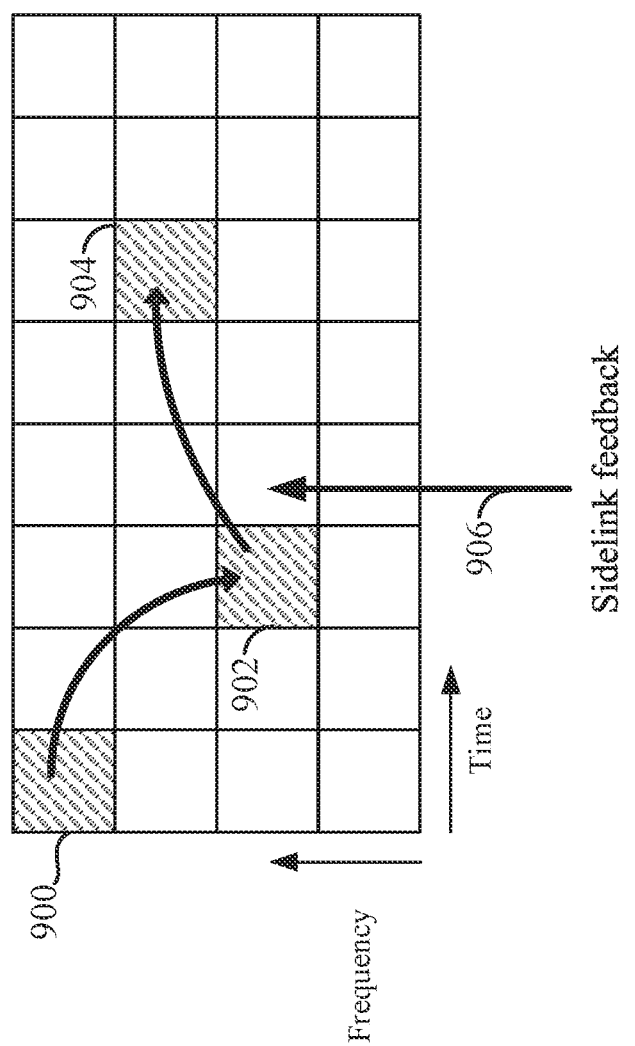
FIG. 9 is a diagram illustrating an example of using retransmission sidelink resources for network coded transmission according to some aspects.

In one aspect, a UE (e.g., UE 1000) can transmit or retransmit sidelink data (e.g., sidelink packets or TB) using reserved sidelink resources (e.g., resource 900 or 902 in FIG. 9). At block 1202, the UE can receive a feedback of the sidelink data. For example, the communication and processing circuitry 1040 can provide a means to receive an ACK or NACK of the sidelink data in a PSFCH from another sidelink device (e.g., UE 602, 604, 606). An ACK indicates that the sidelink data is successfully received by the receiver; otherwise, a NACK indicates that the sidelink data is not successfully received. In some cases, a lack of any feedback (e.g., ACK or NACK) can also indicate that the sidelink data is not successfully received.

At decision block 1204, the UE can determine whether to retransmit the sidelink data or not based on the feedback of the sidelink data. At block 1206, if the UE receives a NACK or a lack of feedback for the sidelink data transmission, the UE can retransmit the sidelink data using available reserved sidelink resources (e.g., reserved sidelink resource 904 in FIG. 9). At block 1208, if the UE receives an ACK for the sidelink data transmission, the UE does not need to retransmit the sidelink data and can select an unused sidelink resource for transmitting network coded sidelink data. In one example, the sidelink resource management circuitry 1044 can provide a means to select the unused sidelink resource.

Figure 13:
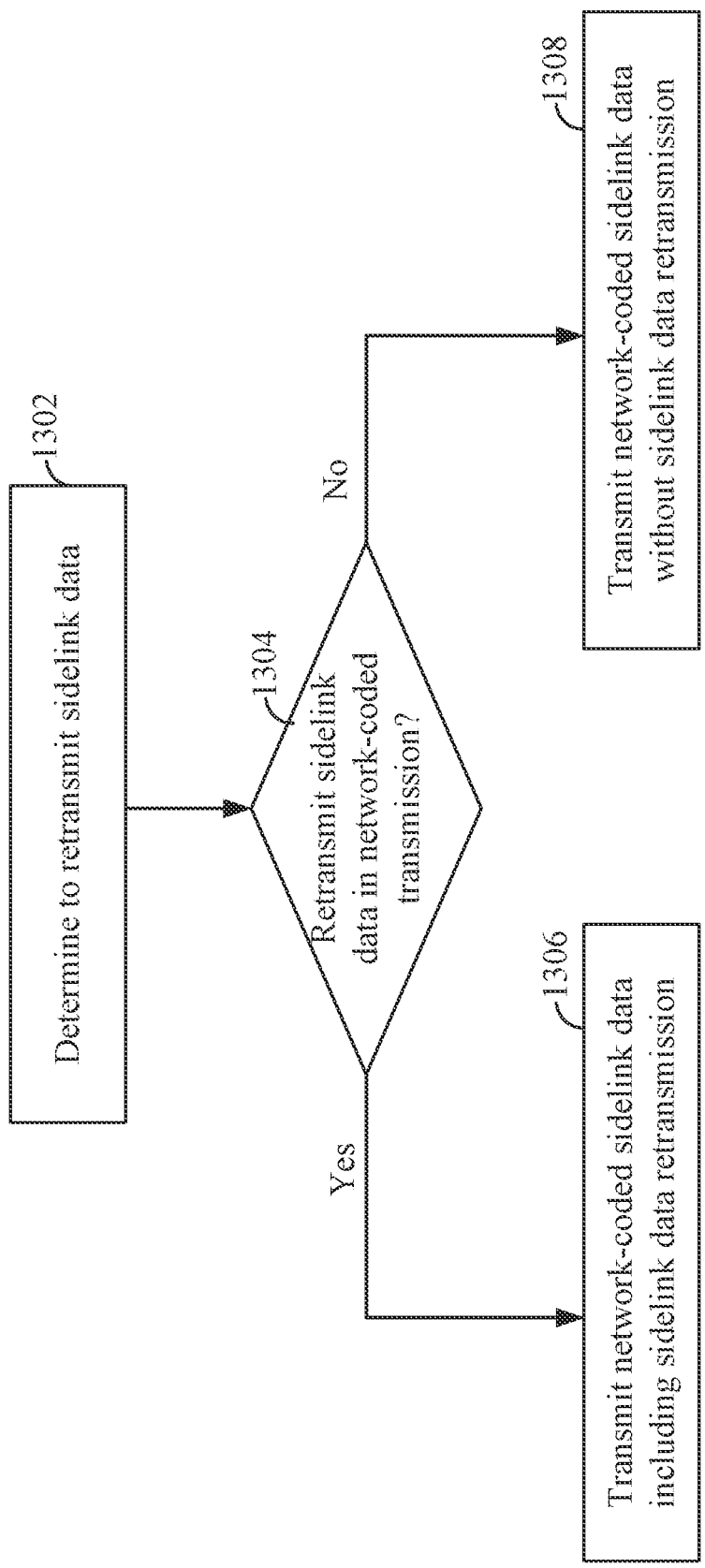
FIG. 13 is a flow chart illustrating an exemplary process for retransmitting sidelink data using a network coded sidelink transmission according to some aspects.

FIG. 13 is a flow chart illustrating an exemplary process 1300 for retransmitting sidelink data using a network coded sidelink transmission according to some aspects. As described below, some or all illustrated features may be omitted in a particular implementation within the scope of the present disclosure, and some illustrated features may not be required for all implementations. In some examples, the process 1300 may be carried out by any of the UEs illustrated in FIGS. 6, 8, and 10. In some examples, the process 1300 may be carried out by any suitable apparatus or means for carrying out the functions or algorithm described below. In some aspects, a UE can use the process 1300 to retransmit sidelink data in a network coded sidelink transmission after a predetermined number of transmissions of the sidelink data.

At block 1302, a UE (e.g., UE 1000) can determine to retransmit sidelink data, for example, using the process 1200 described above. In one example, the UE has not received any feedback (e.g., ACK or NACK) or received a NACK for previously transmitted sidelink data. In one aspect, the communication and processing circuitry 1040 can provide a means to retransmit the sidelink data (e.g., sidelink packet or TB) using reserved sidelink resources (e.g., sidelink resources 900 or 902). The UE may be configured to transmit or retransmit sidelink for a predetermined number of times.

At decision block 1304, the UE can decide whether to retransmit the sidelink data using a network coded sidelink transmission or not. In one example, if the UE has transmitted the sidelink data for a predetermined number of times (including initial transmission and any retransmission(s)), the UE can still retransmit the sidelink data if needed if the retransmitted sidelink data is included in a network coded sidelink transmission. In this case, the UE can transmit the network coded sidelink transmission using the reserved resources irrespective of the feedback status (e.g., NACK) of the sidelink data.

At block 1306, the UE can transmit a network coded sidelink transmission including a retransmission of the sidelink data that has not been ACK'ed in the case that the UE has not transmitted the sidelink data more than a predetermined number of times. In some examples, the predetermined number can be preconfigured (e.g., preloaded by a manufacturer of the UE) and/or configured by the network (e.g., RRC signaling). In some examples, the predetermined number of times can be determined based on the priority of retransmitted sidelink data and/or the network coded sidelink data. The UE can retransmit the sidelink data for a greater number of times for higher priority side link data and vice versa.

At block 1308, the UE can transmit network coded sidelink data without including the sidelink data that has been retransmitted by the UE for at least the predetermined number of times. In one example, the network coded sidelink transmission can include encoded transmission of initial sidelink transmissions (e.g., $Tx_a$, $Tx_b$, $Tx_c$) received from other sidelink devices.

In some aspects, the number of coded sidelink data (e.g., sidelink packets or TBs) in a coded network sidelink transmission can be preconfigured, configured, and/or up to UE implementation. Further, the number of coded sidelink packets or TBs in a coded network sidelink transmission can be determined based on the priority of the sidelink data included in the coded network sidelink transmission and any retransmitted sidelink data. In some aspects, the coding scheme used for the network coded sidelink transmission can be preconfigured, configured, and/or up to implementation. For example, the coding scheme may use an erasure coding scheme that can recover one or more erasures in transmission. In some examples, the coding scheme can be determined based on the priority of the network coded sidelink data and/or the priority of the retransmitted sidelink data.

In one configuration, the apparatus 1000 for wireless communication includes means for network coded sidelink transmission as described above in relation to FIGS. 11-13. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 3, 6, and/or 8, and utilizing, for example, the processes and/or algorithms described herein in relation to FIGS. 11-13.

A first aspect of the disclosure provides an apparatus for wireless communication, comprising: a transceiver configured for wireless communication; a memory; and a processor coupled to the transceiver and the memory, wherein the processor and the memory are configured to: transmit first sidelink data using a first resource of a plurality of resources reserved for transmitting the first sidelink data; receive second sidelink data from one or more sidelink devices; and transmit network coded sidelink data comprising the second sidelink data using one or more second resources of the plurality of resources, based on a feedback of the first sidelink data.

In a second aspect, alone or in combination with the first aspect, wherein the processor and the memory are further configured to: receive the feedback of the first sidelink data, the feedback comprising an acknowledgement of the first sidelink data.

In a third aspect, alone or in combination with the first aspect, wherein the one or more second resources are reserved for retransmitting the first sidelink data.

In a fourth aspect, alone or in combination with any of the first to third aspects, wherein the one or more second resources comprise a subset of remaining resources of the plurality of resources after an initial transmission of the first sidelink data.

In a fifth aspect, alone or in combination with any of the first to third aspects, wherein the processor and the memory are further configured to select the one or more second resources based on a respective priority of each of a plurality of transport blocks within at least the second sidelink data.

In a sixth aspect, alone or in combination with any of the first to third aspects, wherein the processor and the memory are further configured to select an earlier resource of the one or more second resources for transmitting the network coded sidelink data.

In a seventh aspect, alone or in combination with any of the first to third aspects, wherein the processor and the memory are further configured to transmit the network coded sidelink data after a predetermined number of retransmissions of the first sidelink data irrespective of a feedback status of the first sidelink data.

In an eighth aspect, alone or in combination with the seventh aspect, wherein the predetermined number of retransmissions is based on at least one of a first priority of the first sidelink data or a second priority of the second sidelink data.

In a ninth aspect, alone or in combination with any of the first aspect or seventh aspect, wherein the network coded sidelink data further comprises a retransmission of the first sidelink data in addition to the second sidelink data.

In a tenth aspect, alone or in combination with the ninth aspect, wherein a number of transport blocks of the second sidelink data included in the network coded sidelink data is based on at least a respective priority of the transport blocks within the second sidelink data.

An eleventh aspect of the disclosure provides a method for sidelink communication at a wireless apparatus, comprising: transmitting first sidelink data using a first resource of a plurality of resources reserved for transmitting the first sidelink data; receiving second sidelink data from one or more sidelink devices; and transmitting network coded sidelink data comprising the second sidelink data using one or more second resources of the plurality of resources, based on a feedback of the first sidelink data.

In a twelfth aspect, alone or in combination with the eleventh aspect, the method further comprises: receiving the feedback of the first sidelink data, the feedback comprising an acknowledgement of the first sidelink data.

In a thirteenth aspect, alone or in combination with the eleventh aspect, wherein the one or more second resources are reserved for retransmitting the first sidelink data.

In a fourteenth aspect, alone or in combination with any of the eleventh to thirteenth aspects, wherein the one or more second resources comprise a subset of remaining resources of the plurality of resources after an initial transmission of the first sidelink data.

In a fifteenth aspect, alone or in combination with any of the eleventh to thirteenth aspects, the method further comprises: selecting the one or more second resources based on a respective priority of each of a plurality of transport blocks within at least the second sidelink data.

In a sixteenth aspect, alone or in combination with any of the eleventh to thirteenth aspects, the method further comprises: selecting an earlier resource of the one or more second resources for transmitting the network coded sidelink data.

In a seventeenth aspect, alone or in combination with any of the eleventh to thirteenth aspects, the method further comprises: transmitting the network coded sidelink data after a predetermined number of retransmissions of the first sidelink data irrespective of a feedback status of the first sidelink data.

In an eighteenth aspect, alone or in combination with the seventeenth aspect, wherein the predetermined number of retransmissions is based on at least one of a first priority of the first sidelink data or a second priority of the second sidelink data.

In a nineteenth aspect, alone or in combination with any of the eleventh aspect or seventeenth aspect, wherein the network coded sidelink data further comprises a retransmission of the first sidelink data in addition to the second sidelink data.

In a twentieth aspect, alone or in combination with the nineteenth aspect, wherein a number of transport blocks of the sidelink data included in the network coded sidelink data is based on at least one of a respective priority of transport blocks within the second sidelink data.

A twenty-first aspect of the disclosure provides an apparatus for wireless communication, comprising: means for transmitting first sidelink data using a first resource of a plurality of resources reserved for transmitting the first sidelink data; means for receiving second sidelink data from one or more sidelink devices and means for transmitting network coded sidelink data, comprising the second sidelink data using one or more second resources of the plurality of resources, based on a feedback of the first sidelink data.

In a twenty-second aspect, alone or in combination with the twenty-first aspect, the apparatus further comprises: means for receiving the feedback of the first sidelink data, the feedback comprising an acknowledgement of the first sidelink data.

In a twenty-third aspect, alone or in combination with the twenty-first aspect, wherein the one or more second resources are reserved for retransmitting the first sidelink data.

In a twenty-fourth aspect, alone or in combination with any of the twenty-first to twenty-third aspects, wherein the one or more second resources comprise a subset of remaining resources of the plurality of resources after an initial transmission of the first sidelink data.

In a twenty-fifth aspect, alone or in combination with any of the twenty-first to twenty-third aspects, the apparatus further comprises: means for selecting the one or more second resources based on a respective priority of each of a plurality of transport blocks within at least the second sidelink data.

In a twenty-sixth aspect, alone or in combination with any of the twenty-first to twenty-third aspects, the apparatus further comprises: means for selecting an earlier resource of the one or more second resources for transmitting the network coded sidelink data.

In a twenty-seventh aspect, alone or in combination with any of the twenty-first to twenty-third aspects, the apparatus further comprises: means for transmitting the network coded sidelink data after a predetermined number of retransmissions of the first sidelink data irrespective of a feedback status of the first sidelink data.

In a twenty-eighth aspect, alone or in combination with the twenty-seventh aspect, wherein the predetermined number of retransmissions is based on at least one of a first priority of the first sidelink data or a second priority of the second sidelink data.

In a twenty-ninth aspect, alone or in combination with the twenty-first aspect or twenty-seventh aspect, wherein the network coded sidelink data further comprises a retransmission of the first sidelink data in addition to the second sidelink data.

A thirtieth aspect of the disclosure provides a computer-readable storage medium stored with executable code for causing a wireless communication device to: transmit first sidelink data using a first resource of a plurality of resources reserved for transmitting the first sidelink data; receive second sidelink data from one or more sidelink devices; and transmit network coded sidelink data comprising the second sidelink data using one or more second resources of the plurality of resources, based on a feedback of the first sidelink data.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-43 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 § 112(f) unless the element is expressly recited using the phrase "means for" or, in the case of a method claim, the element is recited using the phrase "step for."

What is claimed is:

1. An apparatus for wireless communication, comprising:
a transceiver configured for wireless communication;
a memory; and
one or more processors coupled to the transceiver and the memory, the one or more processors being configured to:
transmit first sidelink data using a first resource of a plurality of resources reserved for transmitting the first sidelink data;
receive second sidelink data from one or more sidelink devices;
encode network coded sidelink data using an erasure coding function based on the second sidelink data and at least one more sidelink data; and
transmit the network coded sidelink data comprising the second sidelink data using one or more second resources of the plurality of resources, based on a feedback of the first sidelink data.

2. The apparatus of claim 1, wherein the one or more processors are further configured to:
receive the feedback of the first sidelink data, the feedback comprising an acknowledgement of the first sidelink data.

3. The apparatus of claim 1, wherein the one or more second resources are reserved for retransmitting the first sidelink data.

4. The apparatus of claim 1, wherein the one or more second resources comprise a subset of remaining resources of the plurality of resources after an initial transmission of the first sidelink data.

5. The apparatus of claim 1, wherein the one or more processors are further configured to select the one or more second resources based on a respective priority of each of a plurality of transport blocks within at least the second sidelink data.

6. The apparatus of claim 1, wherein the one or more processors are further configured to select an earlier resource of the one or more second resources for transmitting the network coded sidelink data.

7. The apparatus of claim 1, wherein the one or more processors are further configured to transmit the network coded sidelink data after a predetermined number of retransmissions of the first sidelink data irrespective of a feedback status of the first sidelink data.

8. The apparatus of claim 7, wherein the predetermined number of retransmissions is based on at least one of a first priority of the first sidelink data or a second priority of the second sidelink data.

9. The apparatus of claim 7, wherein the network coded sidelink data further comprises a retransmission of the first sidelink data in addition to the second sidelink data.

10. The apparatus of claim 9, wherein a number of transport blocks of the second sidelink data included in the network coded sidelink data is based on at least a respective priority of the transport blocks within the second sidelink data.

11. A method for sidelink communication at a wireless apparatus, comprising:
transmitting first sidelink data using a first resource of a plurality of resources reserved for transmitting the first sidelink data;
receiving second sidelink data from one or more sidelink devices;
encoding network coded sidelink data using an erasure coding function based on the second sidelink data and at least one more sidelink data; and
transmitting the network coded sidelink data comprising the second sidelink data using one or more second resources of the plurality of resources, based on a feedback of the first sidelink data.

12. The method of claim 11, further comprising:
receiving the feedback of the first sidelink data, the feedback comprising an acknowledgement of the first sidelink data.

13. The method of claim 11, wherein the one or more second resources are reserved for retransmitting the first sidelink data.

14. The method of claim 11, wherein the one or more second resources comprise a subset of remaining resources of the plurality of resources after an initial transmission of the first sidelink data.

15. The method of claim 11, further comprising:
selecting the one or more second resources based on a respective priority of each of a plurality of transport blocks within at least the second sidelink data.

16. The method of claim 11, further comprising:
selecting an earlier resource of the one or more second resources for transmitting the network coded sidelink data.

17. The method of claim 11, further comprising:
transmitting the network coded sidelink data after a predetermined number of retransmissions of the first sidelink data irrespective of a feedback status of the first sidelink data.

18. The method of claim 17, wherein the predetermined number of retransmissions is based on at least one of a first priority of the first sidelink data or a second priority of the second sidelink data.

19. The method of claim 17, wherein the network coded sidelink data further comprises a retransmission of the first sidelink data in addition to the second sidelink data.

20. The method of claim 19, wherein a number of transport blocks of the second sidelink data included in the network coded sidelink data is based on at least one of a respective priority of transport blocks within the second sidelink data.

21. An apparatus for wireless communication, comprising:
means for transmitting first sidelink data using a first resource of a plurality of resources reserved for transmitting the first sidelink data;
means for receiving second sidelink data from one or more sidelink devices;
means for encoding network coded sidelink data using an erasure coding function based on the second sidelink data and at least one more sidelink data; and
means for transmitting the network coded sidelink data comprising the second sidelink data using one or more second resources of the plurality of resources, based on a feedback of the first sidelink data.

22. The apparatus of claim 21, further comprising:
means for receiving the feedback of the first sidelink data, the feedback comprising an acknowledgement of the first sidelink data.

23. The apparatus of claim 21, wherein the one or more second resources are reserved for retransmitting the first sidelink data.

24. The apparatus of claim 21, wherein the one or more second resources comprise a subset of remaining resources of the plurality of resources after an initial transmission of the first sidelink data.

25. The apparatus of claim 21, further comprising:
means for selecting the one or more second resources based on a respective priority of each of a plurality of transport blocks within at least the second sidelink data.

26. The apparatus of claim 21, further comprising:
means for selecting an earlier resource of the one or more second resources for transmitting the network coded sidelink data.

27. The apparatus of claim 21, further comprising:
means for transmitting the network coded sidelink data after a predetermined number of retransmissions of the first sidelink data irrespective of a feedback status of the first sidelink data.

28. The apparatus of claim 27, wherein the predetermined number of retransmissions is based on at least one of a first priority of the first sidelink data or a second priority of the second sidelink data.

29. The apparatus of claim 27, wherein the network coded sidelink data further comprises a retransmission of the first sidelink data in addition to the second sidelink data.

30. A computer-readable storage medium stored with executable code for causing a wireless communication device to:
transmit first sidelink data using a first resource of a plurality of resources reserved for transmitting the first sidelink data;
receive second sidelink data from one or more sidelink devices;
encode network coded sidelink data using an erasure coding function based on the second sidelink data and at least one more sidelink data; and
transmit network coded sidelink data comprising the second sidelink data using one or more second resources of the plurality of resources, based on a feedback of the first sidelink data.

* * * * *